US007114184B2

(12) United States Patent
Malivanchuk et al.

(10) Patent No.: US 7,114,184 B2
(45) Date of Patent: Sep. 26, 2006

(54) SYSTEM AND METHOD FOR RESTORING COMPUTER SYSTEMS DAMAGED BY A MALICIOUS COMPUTER PROGRAM

(75) Inventors: Taras Malivanchuk, Holon (IL); Moshe Darzi, Petach Tikva (IL); Ofer Rotschield, Kiryat Uno (IL)

(73) Assignee: Computer Associates Think, Inc., Islandia, NY (US)

( * ) Notice: Subject to any disclaimer, the term of this patent is extended or adjusted under 35 U.S.C. 154(b) by 576 days.

(21) Appl. No.: 09/823,673

(22) Filed: Mar. 30, 2001

(65) Prior Publication Data

US 2002/0144129 A1  Oct. 3, 2002

(51) Int. Cl.
*G06F 11/14* (2006.01)
(52) U.S. Cl. .................. 726/24; 713/188; 726/22; 714/38; 717/124; 717/125; 717/126; 717/127; 717/128
(58) Field of Classification Search ............... 713/200, 713/201, 188; 709/224; 714/38; 717/124–128; 726/22, 24
See application file for complete search history.

(56) References Cited

U.S. PATENT DOCUMENTS

| 4,975,950 | A | * | 12/1990 | Lentz | 726/24 |
|---|---|---|---|---|---|
| 5,408,642 | A | * | 4/1995 | Mann | 714/38 |
| 5,485,575 | A | * | 1/1996 | Chess et al. | 714/38 |
| 5,657,445 | A | * | 8/1997 | Pearce | 726/23 |
| 5,822,517 | A | * | 10/1998 | Dotan | 726/22 |
| 5,832,208 | A | * | 11/1998 | Chen et al. | 726/24 |
| 5,918,008 | A | * | 6/1999 | Togawa et al. | 726/24 |
| 6,067,410 | A | | 5/2000 | Nachenberg | |
| 6,108,799 | A | * | 8/2000 | Boulay et al. | 714/38 |
| 6,263,348 | B1 | * | 7/2001 | Kathrow et al. | 707/203 |
| 6,401,210 | B1 | * | 6/2002 | Templeton | 713/200 |
| 6,535,998 | B1 | * | 3/2003 | Cabrera et al. | 714/15 |
| 2002/0178375 | A1 | * | 11/2002 | Whittaker et al. | 713/200 |
| 2002/0188887 | A1 | * | 12/2002 | Largman et al. | 714/13 |

FOREIGN PATENT DOCUMENTS

GB          2 332 962      *    7/1999

OTHER PUBLICATIONS

Neubauer et al., Protection of computer systems from computer viruses: ethical and practical issues, Journal of Computing Sciences in Colleges, vol. 18, Iss. 1, Oct. 2002, pp. 270-279.*
Castaneda et al., WORM vs. WORM: Preliminary Study of an Active Counter-Attack Mechanism, ACM, Oct. 29, 2004, pp. 83-92.*
Copy of Internet Article XP002201935, Simply Super Software: "Trojan Remover", Feb. 11, 2001, URL:http://web.archive.org/web/20010211021705/www.simplysup.com/tremover/details.html, retrieved on Jun. 12, 2002.

(Continued)

*Primary Examiner*—Taghi T. Arani
(74) *Attorney, Agent, or Firm*—Baker Botts L.L.P.

(57) ABSTRACT

A method for restoring a computer system modified by malicious code. The method scans the computer system for the malicious code, identifies the malicious code and retrieves from a data file, information relating to the malicious code including at least one command used for restoring the computer system to a state that existed prior to modification by the malicious code. The at least one command is executed to restore the computer system to substantially the state as it existed prior to modification by the malicious code.

32 Claims, 3 Drawing Sheets

OTHER PUBLICATIONS

Copy of Internet Article XP002201936, Symantec Corporation: "Happy99. Worm Removal Tool", Feb. 29, 2000, URL:http://web.archive.org/web/20000229211041/http://www.sarc.com/avcenter/venc/data/fix.happy99.worm.html, retrieved on Jun. 12, 2002.

* cited by examiner

Figure 3A

Restoration Command
Data Files

W32/Naked

VBS/SST.Worm

Stages.A

Resume.A

Happy99.Worm

Win32/SouthPark.Worm

...

VBS/LoveLetter.AWorm

Figure 3B

Virus Start:

Signature:>xx<xx xx ....

RemoveEXE:

. . .

RemoveEnd:

SysCureStart:

Win9x:

DelRegKey: "HK_LOCAL_MACHINES\Software\Microsoft\Windows\Run","Virus"

ReadRegKey:ST0, "HK_LM..", "Filename"

Strcpy:ST1, %SysDir%

Strcat:ST1,St0

DelFile: ST1

SysCure End:

VirusEnd:

SYSTEM AND METHOD FOR RESTORING COMPUTER SYSTEMS DAMAGED BY A MALICIOUS COMPUTER PROGRAM

BACKGROUND

1. Technical Field

The present disclosure relates to detection and removal of computer programs. More specifically, the present disclosure relates to restoring computer systems damaged by a malicious computer program.

2. Description of the Related Art

Computer viruses are a major problem in modem day computing. Generally, a computer virus is a program (or some unit of code, e.g., instructions to which the computer responds, such as a code block, code element or code segment) that may attach to other programs and/or objects, may replicate itself, and/or may perform unsolicited or malicious actions on a computer system. Although described herein as relating to computer viruses, the present disclosure may be applied to any type of malicious code capable of modifying one or more portions of a computer's resources. One cure for recovering from a computer virus may include removing the computer virus. This may include disabling the virus in an infected object, which may be, for example, a file, a memory area, or the boot sector of a storage medium. However, recent computer viruses have also been seen which manipulate objects in addition to the originally infected object, for example, by deleting or renaming files, manipulating system registry and initialization files, and/or creating unwanted services and processes.

Computer viruses have been seen that may rename an existing file on the computer system and/or replace it with a different file that causes the computer to operate in an undesirable manner. In addition, a virus may modify existing system configuration files while embedding itself in the computer system. An example of a computer virus that does both is the "Happy99.Worm" virus. This particular type of virus travels as an attachment to an email message and causes an infected computer to attach a copy of the virus to outgoing email messages. This type of virus may also place one or more hidden files on the computer's hard drive and/or make changes to the Windows registry file. For example, the "Happy99.Worm" virus renames the file "Wsock32.dll" to "Wsock32.ska" and replaces the original "Wsock32.dll" with its own version of the file. The "Happy99.Worm" virus also creates several other files on the computer system including "Ska.exe" and adds a line to the Windows registry file instructing the computer to run the "Ska.exe" file upon startup.

Simply disabling or removing the virus code without restoring or correctly renaming the files, etc., and/or removing unwanted services or processes, will not effectively restore the computer system. That is, restoring an object to which the virus has attached itself may not always be sufficient, particularly if a number of other objects have been created or modified by the computer virus.

Because each virus may affect different portions of a computer system, specific treatments are required and may require a number of operating system specific operations performed on any number of objects. Therefore, there is a need for a complete cure of an infected computer system that restores all the affected objects.

SUMMARY

The present disclosure relates to a method for restoring a computer system modified by malicious code, comprises scanning the computer system for the malicious code, identifying the malicious code, retrieving from a data file, information relating to the malicious code including at least one command used for restoring the computer system to a state that existed prior to modification by the malicious code and executing the at least one command to restore the computer system to substantially the state as it existed prior to modification by the malicious code. The step of executing the at least one command may include one of reading, writing, and deleting data. The step of executing the at least one command may also include at least one of renaming and deleting an object.

The present disclosure also relates to a storage medium including computer executable code for restoring a computer system modified by malicious code, comprising code for scanning the computer system for the malicious code, code for identifying the malicious code, code for retrieving from a data file, information relating to the malicious code including at least one command used for restoring the computer system to a state that existed prior to modification by the malicious code and code for executing the at least one command to restore the computer system to substantially the state as it existed prior to modification by the malicious code.

The present disclosure also relates to a computer data signal embodied in a transmission medium and including computer executable instructions for restoring a computer system modified by malicious code, comprising a data signal portion for scanning the computer system for the malicious code, a data signal portion for identifying the malicious code, a data signal portion for retrieving from a data file, information relating to the malicious code including at least one command used for restoring the computer system to a state that existed prior to modification by the malicious code and a data signal portion for executing the at least one command to restore the computer system to substantially the state as it existed prior to modification by the malicious code.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 3A shows a data base including virus specific restoration command data files; and FIG. 3B shows commands from one of the restoration command data files according to an embodiment of the present disclosure.

DETAILED DESCRIPTION

Figure 1:
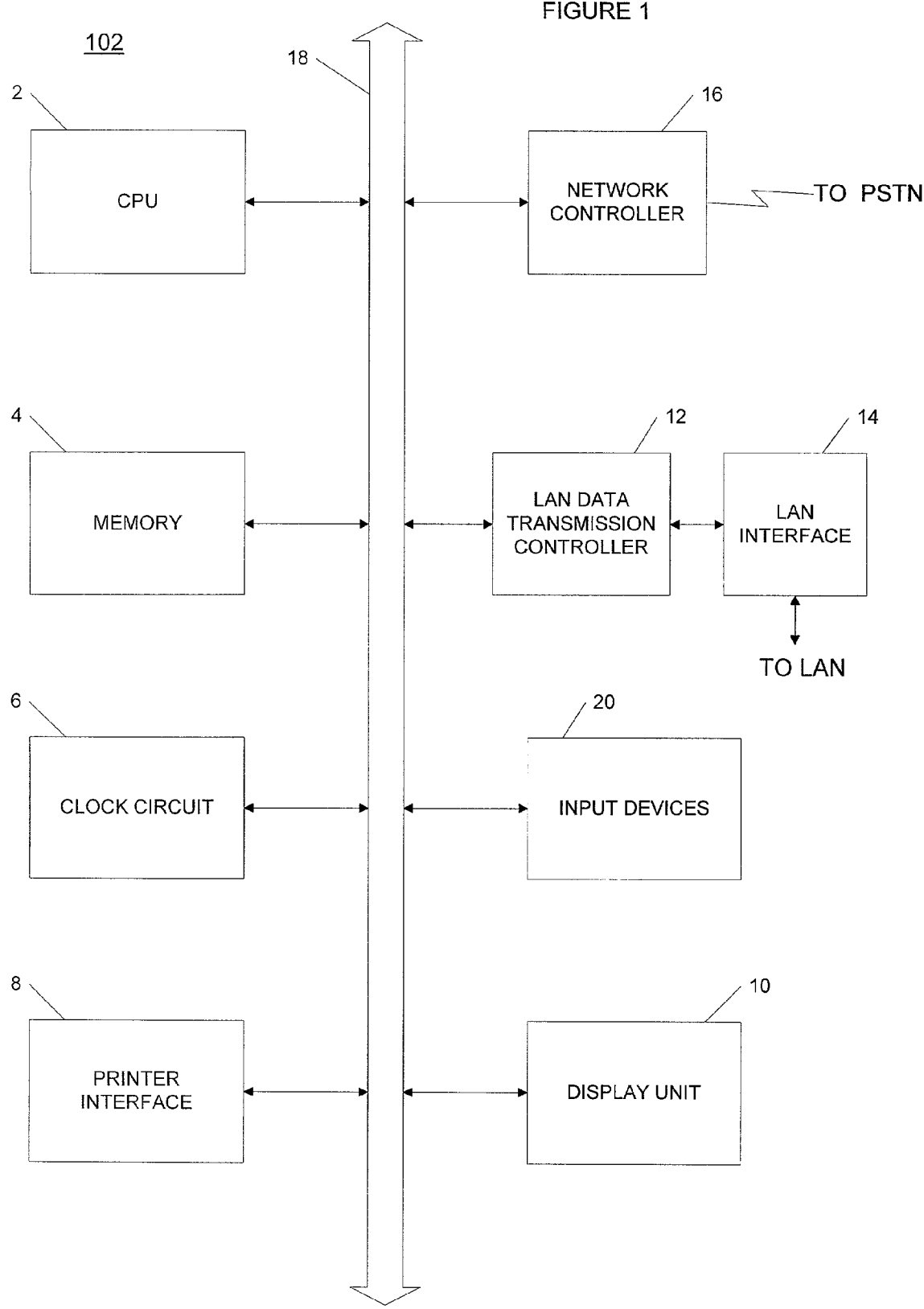
FIG. 1 shows an exemplary computer system to which a system and method for restoring computer systems damaged by malicious code according to an embodiment of the present disclosure may be applied.

In describing a preferred embodiment of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

FIG. 1 is a block diagram of an example of a computer system 102 to which the restoration system and method of the present disclosure may be applied. Computer system 102 may be a standard PC, laptop, mainframe, etc. capable of running software for detecting computer viruses. Computer system 102 is also capable of running software according to the present disclosure for restoring computer system 102 to a state that existed prior to a virus being placed in the system. As shown, computer system 102 may include a central processing unit (CPU) 2, a memory 4, a clock circuit 6, a printer interface 8, a display unit 10, a LAN data transmission controller 12, a LAN interface 14, a network controller 16, an internal bus 18 and one or more input devices 20 such as, for example, a keyboard and mouse. Of course, computer system 102 may not include each component shown and/or may include additional components not shown.

CPU 2 controls the operation of system 102 and is capable of running applications stored in memory 4. Memory 4 may include, for example, RAM, ROM, removable CDROM, DVD, etc. Memory 4 may also store various types of data necessary for the execution of the applications, as well as a work area reserved for use by CPU 2. Clock circuit 6 may include a circuit for generating information indicating the present time, and may be capable of being programmed to count down a predetermined or set amount of time.

The LAN interface 14 allows communication between a network (not shown), which may be a LAN, and the LAN data transmission controller 12. The LAN data transmission controller 12 uses a predetermined protocol suite to exchange information and data with the other devices on the network. Computer system 102 may also be capable of communicating with other networks via a router (not shown). Computer system 102 may also be capable of communicating with other devices via a Public Switched Telephone Network (PSTN) using network controller 16. Computer system 102 may also have access to a WAN (wide area network) and the Internet, for example. Internal bus 18, which may actually consists of a plurality of buses, allows communication between each of the components connected thereto.

Computer system 102 is capable of scanning one or more portions of memory 4 for computer viruses utilizing one or more types of scanning programs designed to recognize and identify computer viruses. For example, the scanning programs may detect a virus's known signature, or may use heuristics logic to detect viruses.

The method and system of the present disclosure may be embodied as computer executable code itself stored in memory 4 or stored elsewhere and accessible by computer system 102. The computer executable code may be stored and executed at a remote site that is in communication with computer system 102 for remotely repairing/restoring computer system 102. The method and system as described herein are capable of restoring computer systems damaged by a computer virus. According to an embodiment, a plurality of virus specific restoration command data files (See FIG. 3A) are accessible by computer system 102. As shown in FIG. 3B, each restoration command data file contains commands or system cure instructions used to restore an infected computer system damaged by the specific virus. Because some viruses may affect different operating systems differently, these commands may be categorized according to operating system specific requirements. The commands are used to restore file names, system registry settings and/or other operating system properties known to be altered or damaged by particular computer viruses.

Examples of commands that may be stored in the restoration command data files and used by the system include the following: copy, delete and rename files; read, write, create and delete Windows registry keys; manipulate INI files; identify and terminate active processes in system memory; launch external programs; manipulate string type variables; manipulate numeric type variables; control the cure instruction flow (depending on run-time input parameters); and control the cure instruction flow (depending on the target operating system). Of course, other commands may be provided as required, depending on the changes performed to the system by the particular virus. Using one or more of the above-listed commands, it may be possible to restore computer systems damaged by viruses.

Figure 2:
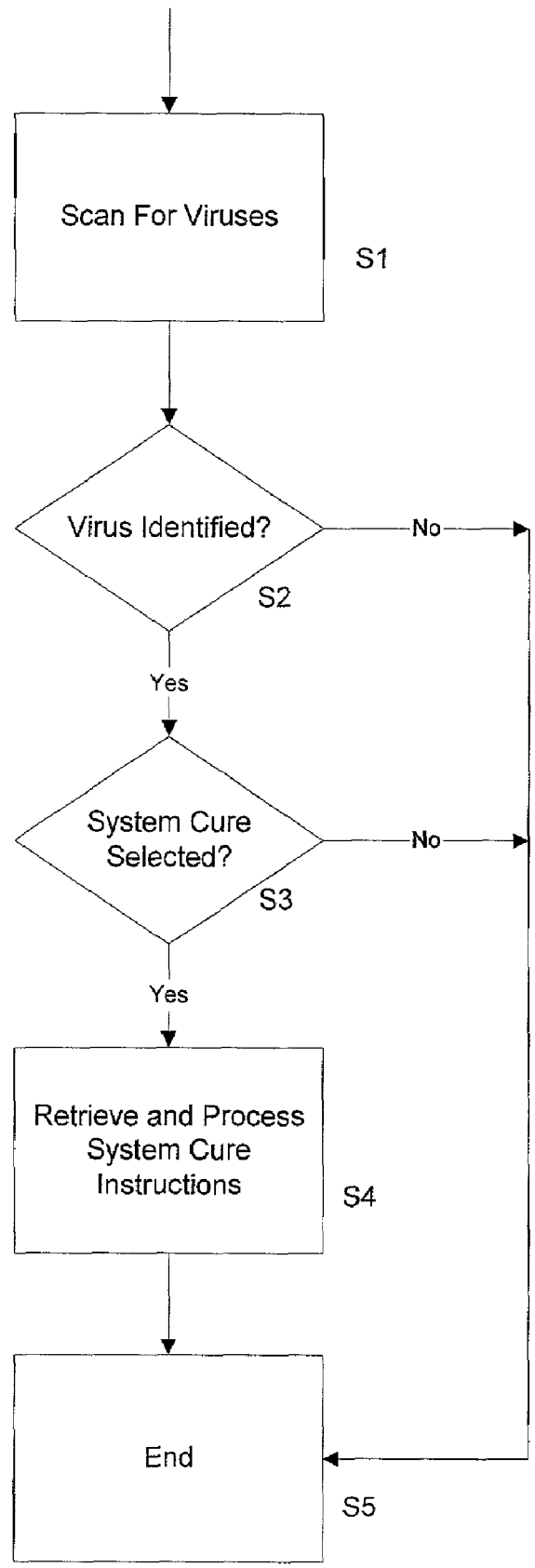
FIG. 2 shows a flow chart of a process for restoring computer systems damaged by malicious code according to an embodiment of the present disclosure.

Referring to FIG. 2, using one or more of the scanning programs, the computer system 102 scans at least a portion of memory 4 for viruses (Step S1). A determination is then made whether a virus was found (Step S2). If no virus is present (No, Step S2) the process exits (Step S5). If a virus is present and has been identified (Yes, Step S2) it is determined whether a system cure option has been selected (Step S3). For example, this can be in the form of a graphic user interface (GUI) that prior to beginning the scanning process, prompts the user into selecting whether the system cure features of the present disclosure are to be applied if a virus is detected. If the system cure option has not been selected (No, Step S3) the process exits (Step S5). If the system cure option has been selected (Yes, Step S3), the restoration command data file corresponding to the identified virus is retrieved. The restoration command data file contains the system cure instructions for restoring the system to the state as it existed prior to having been infected by that virus. The commands or system cure instructions in the restoration command data file are then retrieved and processed (Step S4). The restoration command data file may contain the names of the files affected by the particular virus and the instructions necessary to restore the computer system. After the commands or system cure instructions have been performed, the completed process exits (Step S5).

By way of example, if the "Happy99.Worm" virus is present and has been identified (Yes, Step S2) and the system cure option has been selected (Yes, Step S3), a restoration command data file corresponding to the "Happy99.Worm" virus, and containing system cure instructions used for recovering from the "Happy99.Worm" virus, is retrieved. The instructions are then executed (Step S4), in order to restore the computer to a normal operating condition. For example, the present method and system may execute the "Delete File" command to delete the newly created "Wsock32.dll" and "Ska.exe" files as well as any others created by the virus. It may also execute a "Rename File" command to rename the "Wsock32.ska" file back to its original name "Wsock32.dll". Finally, the method and system may use the "ReadRegKey" and "DeleteRegKey" commands to read and delete any keys and values added to the Windows registry file by the virus. These commands or cure instructions may be listed in the restoration command data file, for example, in the style of programming code.

In order to restore files that may have been manipulated or damaged by a computer virus, a restoration command data file may also include "Delete File", "Rename File", and/or "Copy File" file system commands for manipulating files located on the computer system. In addition, a "Shell" command may be provided through which a system shell command may be executed. These commands may use one or more file names as input parameters depending on usage and return an error condition in case of failure. In case a file to be manipulated is currently used by the system and cannot be accessed, the file system command will not return an error condition; rather, the command will alert the computer system that a computer restart is necessary to release the file. Once the file is released, the present method and system will execute the previously attempted file system command.

Computer viruses may start unwanted processes and/or services running on a computer system. Accordingly, a restoration command data file may also contain process manipulation commands for stopping processes and services currently running on a computer system. For example, a "Kill Process" command may be used to stop a process currently running on the computer system, and a "Kill Service" command may be used to stop a service and remove it from the Windows registry file.

Computer viruses may also tamper with operating system files including Windows registry and/or initialization files. The Windows registry is a database consisting of two files used to store settings and options for Windows and contains information and settings for all the hardware, software, users, and preferences of the computer. The Windows registry has a hierarchical structure with main branches containing sub-branches, called "keys", which store "values" containing the actual information stored in the registry. Some computer viruses may tamper with the Windows registry and/or initialization files. For example, during installation, the "Happy99.Worm" virus may add to the Windows registry, a key with a corresponding value, where the value is the name of a file to be executed upon system startup, thereby activating the virus unbeknownst to the user every time the computer is started. Accordingly, in order to restore a computer system damaged by such a computer virus, the restoration command data file may also include the ability to read, write and delete values located within Windows files, such as the Windows registry, and/or initialization (INI) files, such as "System.ini". The Windows registry manipulation commands used may include "ReadRegKey", "WriteRegKey", and "DelRegKey", while the INI file manipulation commands may include "ReadINIKey" and "WriteINIKey". The command names, input parameters and functions are as follows:

ReadRegKey (variable, key, value) reads data located in a value field of a key into a variable;

WriteRegKey (key, value, variable) writes data from a variable into a value field of a key.

If the key or the value does not exist, they will be created;

DeleteRegKey (key, value) deletes the value field of a specified key, or if the value parameter is left empty, the entire key;

ReadINIKey (variable, INI filename, Section, Key) reads data located in a section field of a key located within a specified INI file; and WriteINIKey (INI filename, Section, Key, variable) writes data from a variable into a section field of a key located within a specified INI file. If the variable is set to 'NULL', then the key will be removed.

In the above commands, an error condition may be raised during 'read' and 'delete' commands in the event that key or value inputs do not exist on the computer system, and in 'write' and 'delete' commands in the event a write failure occurred. If a command returns an error after execution, such as an error indicating a failure to copy a non-existent file, or reading a non-existent Windows registry key, the present method and system may either ignore the error or stop the curing process. For example, including an OnErrorAbort command will cause the curing process to be aborted upon the occurrence of the first error, while including an OnErrorContinue command will cause the curing process to continue upon the occurrence of one or more errors. The present method and system are set to OnErrorContinue by default so that the curing process will continue even in the event of one or more errors.

A restoration command data file may also include string manipulation commands for manipulating string variables in the event they are altered by a virus. Examples of such commands may include a StrCpy command that copies a source string, macro or constant value into a destination string. A StrCat command may concatenate the source string, macro or constant value into a destination string.

The restoration command data files may be stored in a data store in memory 4 and/or in other storage media accessible by computer system 102. For example, the restoration command data files may be stored on a separate storage system connected via a local area network or the Internet, where they may be accessed directly or updated periodically. An example of the contents of a restoration command data file that may be used to recover from the "Happy99.Worm" virus is shown in FIG. 3B. The portion of the code between "VirusStart" and "RemoveEnd:" is used to detect the virus and to cure the infected file. This section of code may or may not be provided in the restoration command data file. The section of code between "SysCureStart:" and "SysCureEnd:" is used to cure the computer system utilizing the techniques described herein.

After the computer system identifies the virus and accesses the appropriate restoration command data file, the computer system reads from the data file the list of commands for restoring the computer system. As shown in FIG. 3B, the SysCureStart and SysCureEnd markers begin and terminate command blocks found within the data files. According to this example, the computer system first executes the DelRegKey command along with key and value parameters retrieved from the data file. The key and value parameters are virus specific and in this case are "HK_LOCAL_MACHINE\Software\Microsoft\Windows\Run" and "Virus" respectively. When inserted into the Windows registry file by the virus, this key and value combination cause the computer system to execute the file "Virus" upon startup. Accordingly, once this value is deleted from the Windows registry by the computer system utilizing the present system and method, the computer system will no longer attempt to execute that file upon startup.

While the computer system will no longer attempt to execute the virus file upon startup, an executable virus file is still resident on the system and should be deleted. Accordingly, the restoration command data file also includes a ReadRegKey command along with destination variable, key and value parameters for loading the value located in the specified value field into a first variable where it is stored. This value is the name of the executable file that "Happy99.Worm" arranged to be executed upon system startup, e.g. "Ska.exe". The computer system then executes the Strcat command to concatenate this variable with the path name of the system directory, which may vary from system to system and so is symbolized by the system macro "%SysDir%", into a second variable now containing the system path followed by the executable virus file name. The computer system then executes DelFile using the second variable as a parameter thereby deleting the executable file. This technique allows the computer system to delete the virus, independent of the actual name of the executable file.

An Operating System (OS) variable may be used to identify the operating system within which the commands listed afterward may be executed and may be set to Windows 95, Windows 98, Windows NT, Windows 2000, or All. If there is a command specific to an operating system, then that command may be listed under a subsection of the restoration command data file identified by that operating system. If there is a command that may be used on all operating systems, then that command may listed under a general section or a subsection and executed for all operating sytems. In FIG. 3B, the Operating System variable, "Win9x", indicates that the commands listed within the code section are to be executed on computer systems running the Windows 95, 98, ME operating systems. The present system and method may determine the operating system using a standard system application program interface (API). Once the operating system is determined, this information may be stored and used for conditional branching when executing commands in the restoration command data files.

The restoration command data files may also include other types of commands. For example, if it is necessary to repair or replace files or data not readily available, code may be provided in the restoration command data files for prompting the user to insert a system disk containing the appropriate files or data. Code may be included for retrieving the files or data from the system disk and for replacing the damaged or missing files on the computer system. The restoration command data files may also include code for launching an Internet browser from the computer system and for accessing a known website having the appropriate files or data for restoring the computer system. Code may be included in the restoration command data files for prompting the user to download the appropriate files or data or for automatically downloading the files or data from the website and for restoring the missing or damaged files or data on the computer system.

The present disclosure may be conveniently implemented using one or more conventional general purpose digital computers and/or servers programmed according to the teachings of the present specification. Appropriate software coding can readily be prepared by skilled programmers based on the teachings of the present disclosure. The present disclosure may also be implemented by the preparation of application specific integrated circuits or by interconnecting an appropriate network of conventional component circuits.

Numerous additional modifications and variations of the present disclosure are possible in view of the above-teachings. It is therefore to be understood that within the scope of the appended claims, the present disclosure may be practiced other than as specifically described herein.

What is claimed is:

1. A method for restoring a computer system modified by malicious code, comprising:
    scanning the computer system for the malicious code;
    identifying the malicious code;
    retrieving from a data file, information relating to the malicious code including at least one command used for restoring the computer system to a state that existed prior to modification by the malicious code; and
    executing the at least one command to restore the computer system to the state as the computer system existed prior to modification by the malicious code, wherein the at least one command is used for restoring at least a portion of the computer system other than a host file having the malicious code to the state that existed prior to the portion of the computer system having been modified by the malicious code.

2. The method of claim 1, wherein the step of executing the at least one command includes one of reading, writing, and deleting data.

3. The method of claim 1, wherein the step of executing the at least one command includes at least one of renaming and deleting a file.

4. The method of claim 1, wherein the malicious code modifies at least one file and said method comprises:
    reading from the modified file, a name of a second file; and
    modifying the second file.

5. The method of claim 1, wherein the data file comprises a plurality of data files, each data file being provided for a particular type of malicious code, each data file including at least one command that can be used for restoring the computer system to a state that existed prior to modification by the particular type of malicious code.

6. The method of claim 1, wherein the information relating to the malicious code further comprises at least one command for curing a file infected with the malicious code.

7. The method of claim 1, wherein executing the at least one command comprises modifying a registry file.

8. The method of claim 1, wherein executing the at least one command comprises stopping a process.

9. A storage medium computer executable code for restoring a computer system modified by malicious code, comprising:
    code for scanning the computer system for the malicious code;
    code for identifying the malicious code;
    code for retrieving from a data file, information relating to the malicious code including at least one command used for restoring the computer system to a state that existed prior to modification by the malicious code; and
    code for executing the at least one command to restore the computer system to the state as the computer system existed prior to modification by the malicious code, wherein the at lest one command is used for restoring at least a portion of the computer system other than a host file having the malicious code to the state that existed prior to the portion of the computer system having been modified by the malicious code.

10. The storage medium of claim 9, wherein the code for executing the at least one command includes code for performing at least one of reading, writing, and deleting data.

11. The storage medium of claim 9, wherein the code for executing the at least one command includes code for performing at least one of renaming and deleting a file.

12. The storage medium of claim 9, wherein the malicious code modifies at least one file, said storage medium further comprising:
    code for reading from the modified file, a name of a second file; and
    code for modifying the second file.

13. The storage medium of claim 9, wherein the data file comprises a plurality of data files, each data file being provided for a particular type of malicious code, each data file including at least one command that can be used for restoring the computer system to a state that existed prior to modification by the particular type of malicious code.

14. The storage medium of claim 9, wherein the information relating to the malicious code further comprises at least one command for curing a file infected with the malicious code.

15. The storage medium of claim 9, wherein the code for executing the at least one command includes code for modifying a registry file.

16. The storage medium of claim 9, wherein the code for executing the at least one command includes code for stopping a process.

17. A computer data signal embodied in a tangible transmission medium and including computer executable instructions for restoring a computer system modified by malicious code, comprising:
- a data signal portion for scanning the computer system for the malicious code;
- a data signal portion for identifying the malicious code;
- a data signal portion for retrieving from a data file, information relating to the malicious code including at least one command used for restoring the computer system to a state that existed prior to modification by the malicious code; and
- a data signal portion for executing the at least one command to restore the computer system to the state as the computer system existed prior to modification by the malicious code, wherein the at least one command is used for restoring at least a portion of the computer system other than a host file having the malicious code to the state that existed prior to the portion of the computer system having been modified by the malicious code.

18. The computer data signal of claim 17, wherein the data signal portion for executing the at least one command performs at least one of reading, writing, and deleting data.

19. The computer data signal of claim 17, wherein the data signal portion for executing the at least one command performs at least one of renaming and deleting a file.

20. The computer data signal of claim 17, wherein the malicious code modifies at least one file, said computer data signal further comprising:
- a data signal portion for reading from the modified file, a name of a second file; and
- a data signal portion for modifying the second file.

21. The computer data signal of claim 17, wherein the data file comprises a plurality of data files, each data file being provided for a particular type of malicious code, each data file including at least one command that can be used for restoring the computer system to a state that existed prior to modification by the particular type of malicious code.

22. A computer signal of claim 17, wherein the information relating to the malicious code further comprises at least one command for curing a file infected with the malicious code.

23. The computer data signal of claim 17, wherein the data signal portion for executing the at least one command modifies a registry file.

24. The computer data signal of claim 17, wherein the data signal portion for executing the at least one command stops a process.

25. A programmed computer system including a program for restoring a computer system modified by malicious code, comprising:
- means for scanning the computer system for the malicious code;
- means for identifying the malicious code;
- means for retrieving from a data file, information relating to the malicious code including at least one command used for restoring the computer system to a state that existed prior to modification by the malicious code; and
- means for executing the at least one command to restore the computer system to the state as the computer system existed prior to modification by the malicious code, wherein the at least one command is used for restoring at least a portion of the computer system other than a host file having the malicious code to the state that existed prior to the portion of the computer system having been modified by the malicious code.

26. The programmed computer system of claim 25, wherein the means for executing the at least one command includes means for performing at least one of reading, writing, and deleting data.

27. The programmed computer system of claim 25, wherein the means for executing the at least one command includes means for performing at least one of renaming and deleting a file.

28. The programmed computer system of claim 25, wherein the malicious code modifies at least one file and said system further comprises:
- means for reading from the modified file, a name of a second file; and
- means for modifying the second file.

29. The programmed computer system of claim 25, wherein the data file comprises a plurality of data files, each data file being provided for a particular type of malicious code, each data file including at least one command that can be used for restoring the computer system to a state that existed prior to modification by the particular type of malicious code.

30. A programmed computer system of claim 25, wherein the information relating to the malicious code further comprises at least one command for curing a file infected with the malicious code.

31. The programmed computer system of claim 25, wherein the means for executing the at least one command includes means for modifying a registry file.

32. The programmed computer system of claim 25, wherein the means for executing the at least one command includes means for stopping a process.

* * * * *